United States Patent
McCurdy et al.

[19]

[11] Patent Number: 6,124,026

[45] Date of Patent: Sep. 26, 2000

[54] ANTI-REFLECTIVE, REDUCED VISIBLE LIGHT TRANSMITTING COATED GLASS ARTICLE

[75] Inventors: Richard J. McCurdy, Toledo; Michel J. Soubeyrand, Holland; David A. Strickler, Toledo, all of Ohio

[73] Assignee: Libbey-Owens-Ford Co., Toledo, Ohio

[21] Appl. No.: 09/105,513

[22] Filed: Jun. 26, 1998

Related U.S. Application Data

[60] Provisional application No. 60/051,804, Jul. 7, 1997.

[51] Int. Cl.$^7$ ...................................................... B32B 17/06
[52] U.S. Cl. ......................... 428/216; 359/359; 359/580; 359/586; 359/589; 428/212; 428/336; 428/432; 428/697; 428/699; 428/701; 428/702
[58] Field of Search ..................................... 428/697, 701, 428/702, 432, 216, 212, 699, 336; 359/359, 580, 586, 589

[56] References Cited

U.S. PATENT DOCUMENTS

| | | |
|---|---|---|
| 2,478,385 | 8/1949 | Gaiser . |
| 3,531,313 | 9/1970 | Dates . |
| 4,293,836 | 10/1981 | Arikawa . |
| 4,333,861 | 6/1982 | Aoki et al. . |
| 4,422,721 | 12/1983 | Hahn et al. . |
| 4,504,109 | 3/1985 | Taga et al. . |
| 4,581,280 | 4/1986 | Taguchi et al. . |
| 4,998,239 | 3/1991 | Strandjord et al. . |
| 5,085,910 | 2/1992 | Matsushima et al. . |
| 5,234,748 | 8/1993 | Demiryont et al. . |
| 5,362,552 | 11/1994 | Austin . |
| 5,496,621 | 3/1996 | Makita et al. . |
| 5,579,162 | 11/1996 | Bjornard et al. . |
| 5,603,983 | 2/1997 | Clough et al. . |
| 5,652,476 | 7/1997 | Matsuda et al. . |

FOREIGN PATENT DOCUMENTS

| | | |
|---|---|---|
| 0 780 346 | 7/1996 | European Pat. Off. . |
| 2 302 102 | 5/1996 | United Kingdom . |

*Primary Examiner*—Archene Turner
*Attorney, Agent, or Firm*—Marshall & Melhorn

[57] ABSTRACT

A color neutral absorbing film applied as a coating on a glass substrate. The film is an antimony/tin oxide alloy coating containing at least about five atomic percent antimony. The coating is suitable for use in anti-reflective coatings containing other metal oxides or mixed metal oxides to achieve a coated glass article having a visible light transmittance of 30% or greater and a reflectance of less than 5%.

20 Claims, No Drawings

ANTI-REFLECTIVE, REDUCED VISIBLE LIGHT TRANSMITTING COATED GLASS ARTICLE

CROSS REFERENCE TO RELATED APPLICATION

This application is claiming the benefit, under 35 U.S.C. 119(e) of the provisional application filed on Jul. 7, 1997, under 35 U.S.C. 111(b), which was granted Ser. No. 60/051,804. The provisional application, 60/051,804, is hereby incorporated by reference.

BACKGROUND OF THE INVENTION

This invention relates to a neutral absorbing film suitable for use as a coating on a glass substrate. More particularly, this invention relates to a non-conductive and energy absorbing coating of an antimony/tin oxide alloy. Even more particularly, this invention is directed to an antimony/tin oxide alloy coating applied onto a glass substrate to impart energy absorption and anti-reflective properties to the coated glass article.

Coatings on glass are commonly utilized to provide specific energy attenuation and light transmittance properties. Additionally, coatings are designed to reduce reflections from interfaces between individual coating layers and the glass when a plurality of coatings are applied onto a glass substrate. The coated articles are often utilized singularly, or in combination with other coated articles, to form a glazing.

The attributes of a coated glass substrate are dependent upon the specific coatings applied to the glass substrate. The coating compositions and thicknesses impart energy absorption and light transmittance properties within the coated article while also affecting the spectral properties. Desired attributes may be obtainable by adjusting the compositions or thicknesses of the coating layer or layers. However, adjustments to enhance a specific property can adversely impact other transmittance or spectral properties of the coated glass article. Obtaining desired spectral properties is often difficult when trying to combine specific energy absorption and light transmittance properties in a coated glass article.

Anti-reflective coatings on glass are utilized to reduce the surface reflection of optical components and to reduce the reflectance of an interface between optical media with different refractive indices. The reduction of visible reflection is achieved by the principle of optical interference. When light impinges on the air-film, film-film, and film-glass interfaces, a portion of the beam is reflected at each interface. By proper choice of thin film materials and thicknesses, the individual reflected light beams can destructively interfere thereby reducing the observed visual reflectance.

The utilization of a coating having absorption properties enables further reduction in reflection by absorbing the light as it travels through the high index absorbing film thereby reducing the light energy incident on the back glass interface and glass-film interface. The absorption of visible light results in the reduction of visible light transmitted through the glass. Generally, absorbing films are strongly colored and therefore do not result in a neutral transmittance or reflectance. The utilization of an energy absorbing film is preferred when the minimization of visible reflection is desired and a reduction of visible light transmittance is acceptable.

Absorbing films may also adversely impact the visible light transmittance to a level unacceptable for anti-reflective and solar control applications. For example, European Patent publication EP0780346 A1 discloses a method for producing tin oxide films doped with antimony oxide. The films are applied pyrolytically and result in a film having a molar ratio of tin to antimony of 1:0.2 to 1:0.5. The resulting films, when applied onto a neutral glass substrate at a thickness of about 50 nm to about 1,500 nm, result in a visible light transmittance of less than 10 percent. The color of the films are generally a dark, gray-violet color. Thus, the low visible light transmittance and spectral properties renders such films undesirable for anti-reflective glass applications.

It would be advantageous to provide a coated glass article having a non-conductive, color neutral absorbing film that is capable of reducing the visible reflection from the glass while permitting a visible light transmittance of at least 30 percent. The film should also provide the desirable neutral color in both transmittance and reflectance.

It would be a further advantage to provide a non-conductive, color neutral absorbing film that may be applied pyrolytically onto a glass substrate. A pyrolytic film enables the deposition of the film on-line, for example, in a float glass production process.

SUMMARY OF THE INVENTION

In accordance with the present invention, there is provided a non-conductive, color neutral absorbing film suitable for use as a coating on glass. The film may be utilized for either solar control or anti-reflective glass articles. The film is an antimony/tin oxide alloy produced by combining an antimony source with conventional tin oxide deposition precursors. The amount of antimony present in the film is at least about five atomic percent. Due to considerations of cost and ease of manufacture, the amount of antimony present in the film is preferably from about five atomic percent to about ten atomic percent.

The antimony/tin oxide alloy is preferably applied pyrolytically, on-line onto a float glass ribbon. The energy absorption properties of the film make it suitable for use with either solar control or anti-reflective glass articles.

In an anti-reflective glass, the energy absorbing film, having a refractive index of about 1.8 to about 2.6, may be utilized with a metal oxide, having a lower refractive index, to form a coated glass article. The high refractive index film is applied closest to the glass with the low refractive index film functioning as an outer layer. The high/low stack reduces visible reflection to a level below five percent by the principle of optical interference. Additionally, the absorbing properties of the film enable a further reduction in visible reflection to a level below two percent. The thicknesses and optical characteristics of the coating stack may be adjusted to achieve a broad range of specified transmittance values. However, in a preferred embodiment, the coated glass article has a visible light transmittance (Ill C) of at least 30%. The reflection and transmittance of visible light are both aesthetically neutral in color.

It is an object of the present invention to provide an energy absorbing, neutral colored film for use as a coating on a glass substrate. The antimony/tin oxide alloy is an energy absorbing film that may be deposited onto a glass substrate. The energy absorbing properties enable the use of the film in both anti-reflective and solar control coating stacks. Furthermore, the film exhibits a desirable neutral color in both transmittance and reflection.

It is a further object of the present invention to provide an absorbing film that can be pyrolytically deposited onto a glass substrate. The antimony/tin oxide alloy of the present invention is suitable for use in conventional tin oxide deposition precursors. The pyrolytic deposition enables the application of the film onto a float glass ribbon directly in the glass production process.

DETAILED DESCRIPTION OF THE PREFERRED EMBODIMENT

In accordance with the present invention, it has been discovered that an antimony/tin oxide alloy film, having about five atomic percent to about ten atomic percent antimony, is suitable for use in a coated glass article. The film is an energy absorbing film that exhibits a neutral color in visible light transmission and reflection. The coated glass article is especially suitable for use with anti-reflective glass articles utilized for computer displays or monitors. However, the coated glass article of the present invention may also be utilized for other applications, such as architectural glazings and vehicle windows.

The glass substrates suitable for use in preparing the coated glass article according to the present invention may include any of the conventional clear glass compositions known in the art. The preferred substrate is a clear float glass ribbon wherein the coating of the present invention, along with other optional coatings, is applied in the heated zone of the float glass process. However, other conventional processes for applying coatings on glass substrates are suitable for use with the present inventive coating. Additionally, colored glass compositions may be utilized with the antimony/tin oxide alloy film of the present invention to achieve specific spectral and energy attenuation properties.

The antimony tin oxide coating of the present invention is a non-conductive, neutral colored film suitable for deposition onto a glass substrate. The film is a mixed antimony/tin oxide alloy produced by including an amount of antimony of about five atomic percent to about ten atomic percent in a tin oxide film.

The antimony/tin oxide alloy films of the present invention enable the attenuation of light energy as it passes through the coated glass article. Energy applied to a coated glass article is either transmitted, reflected, or absorbed. The antimony/tin oxide alloy is an energy absorbing film which reduces the amount of light energy incident to the back glass-air interface and the glass film interface. Thus, the amount of reflected light is significantly reduced. The absorption of light results in the reduction of transmitted light through the glass. The absorption properties make the coating suitable for applications on glass for both anti-reflective coatings and solar control coatings.

The absorption properties of a coating or film are indicated by the extinction coefficient (k). Non-absorbing films have extinction coefficients of zero. Extinction coefficients for absorbing films are greater than 0.1, with higher values indicating greater energy absorption properties. The extinction coefficient for the antimony/tin oxide alloy coating is preferably about 0.1 to about 0.3.

Additionally, the antimony/tin oxide alloy coating of the present invention is a non-conductive film. Non-conductive films generally have a sheet resistance of greater than about 500 ohms per square. Coatings with sheet resistance value less than 500 ohms per square are considered conductive coatings.

Typically, absorbing materials are strongly colored. Therefore, when applied to films they enable either a neutral color in transmittance or reflectance, but generally can not be adjusted to accomplish both. The present inventive coating exhibits an aesthetically neutral color in both transmittance and reflectance. The color is preferably indicated by CIELAB color scale values of a* of about 6 to −9 and b* of about 6 to about −9.

For a pyrolytic deposition, the antimony/tin oxide alloy is deposited onto the glass substrate by incorporating an antimony source with conventional tin oxide precursors. An example would include the use of antimony trichloride in an organic solvent, which is vaporized and injected into a precursor gas stream containing dimethyltin dichloride, oxygen, and water in a helium carrier gas.

The absorbing coating of the present invention can be utilized as an anti-reflective coating in conjunction with other coatings to reduce the visible reflection by the principle of optical interference. Thus, the present inventive coating, having a refractive index of about 1.8 to about 2.6, may be utilized with a film having a low refractive index to achieve additional reductions in visible reflection beyond those accomplished through absorption. An anti-reflective coating produced in accordance with the present invention may reduce visible reflections below 5%, and preferably below 2%. The reduction in visible reflection is achieved while maintaining a visible light transmittance (Illuminant C two degree observer) of at least 30% or greater, preferably at least 40% or greater, and most preferably at least 50% or greater.

For example, the present inventive coating may be utilized with a film having a refractive index of about 1.45 to about 1.6, such as silicon oxide ($SiO_2$). A film stack on a clear substrate including a layer of antimony/tin oxide alloy followed by a layer of silicon oxide is capable of achieving a visible reflectance below 2% and a neutral visible light transmittance (Ill C) of greater than 30%.

Additionally, a barrier layer may be applied to the glass prior to the application of the antimony/tin oxide alloy film. Barrier layers are utilized to prevent the migration of alkali metal ions from the glass substrate into the film. The migration of the alkali metal ions reduces the quality of the coated glass article and results in the undesirable appearance of haze in the article. Barrier layers may include coatings of silicon oxide, silicon oxycarbide, or aluminum oxide. A barrier layer is generally applied at about 100 −200 angstroms thick.

Alternatively, a conductive coating may also be applied in an anti-reflective coating stack in conjunction with the coating of the present invention. A conductive coating would enhance the utilization of the anti-reflective film by enabling the coated article to dissipate static charges that can build up on computer monitor screens. The conductive coating is generally applied onto the antimony/tin oxide alloy prior to applying the metal oxide coating.

Conventional conductive coatings generally recognized within the art may be suitable for use in the present invention. Conductive metal oxide suitable for use with the invention include compounds selected from the group consisting of indium oxide doped with tin, indium oxide doped with fluorine, tin oxide doped with fluorine, tin oxide doped with antimony (less than 5, and typically 1 to 2 atomic weight percent antimony), zinc oxide doped with aluminum, zinc oxide doped with fluorine, zinc oxide doped with boron, and tungsten oxide doped with fluorine. The conductive metal oxide is applied at a thickness of about 200 angstroms to about 5000 angstroms. Preferred conductive coatings include tin oxide doped with fluorine and indium oxide doped with tin.

In an anti-reflective coating, the thickness of each layer is a function of the desired component stack and the preferred reflectivity. Thus, the thickness of each layer is selected based upon the refractive indices of each film utilized in the stack and the preferred level of reflectivity. One example of an anti-reflective coating would include the deposition of a barrier layer of about 100 angstroms of silicon oxide onto a 0.125 inch thick float glass ribbon. About 1200 angstroms of antimony/tin oxide is then applied over the barrier layer. A layer of silicon oxide of about 700 angstroms thick is applied over the antimony/tin oxide alloy coating. The resulting article has a visible light transmittance (Ill C) of 52% and a visible reflection of about 1.7%.

In comparison to conventional anti-reflective coatings, the present invention significantly reduces the visible reflection while also reducing the visible light transmittance. Conventional two layer anti-reflective coatings generally utilize a stack with each layer being ¼ λ at a 550 nm design wavelength. The layers have alternating high and low refractive indices. An example would include an undoped tin oxide layer of about 705 angstroms thick on a 0.125 inch glass substrate with a silicon oxide layer of about 948 angstroms thick applied over the tin oxide layer. The resulting coated articles exhibit a visible light transmittance (Ill C) of 92.5% and a visible reflection of 5.5%. The present inventive coating has achieved a visible light transmittance (Ill C) of 52% and a reflection of 1.7%. A clear glass substrate without coatings will typically reflect over 8% of the visible light.

The antimony/tin oxide alloy of the present invention may also be utilized with conventional multilayer anti-reflective stacks having greater than two anti-reflective films. The antimony/tin oxide alloy is suitable for use as a medium or high refractive index coating, depending upon the refractive index of other coatings used within the multiple layer stack. For example, the antimony/tin oxide alloy of the present invention could be applied over a glass substrate with a titanium oxide coating applied over the antimony/tin oxide coating and a silicon oxide coating applied over the titanium oxide coating. The titanium oxide coating would have a higher refractive index with the antimony/tin oxide alloy having an intermediate refractive index. The coated article would have a visible light transmittance (Ill C) of at least 30% and a visible reflectance, from the film side, of less than 1%.

The anti-reflective coated glass article is ideally suited for use in computer screens where a high contrast and neutral transmittance are desirable with little visible light reflection from the screen. Additionally, the antimony/tin oxide alloy film is suitable for use in various architectural and automotive applications where high reflectivity is undesirable.

The following examples, which constitute the best mode presently contemplated by the inventors for practicing the present invention, are presented solely for the purpose of further illustrating and disclosing the present invention, and is not to be construed as a limitation on, the invention:

EXAMPLE 1

A float glass process was used to produce a clear float glass ribbon having a thickness of 0.125 inches. The glass ribbon was traveling at a line speed of about 433 inches per minute. A conventional coating apparatus is utilized in the float bath to apply a 203 angstrom coating of silicon oxide onto the surface of the float glass ribbon. The coating was applied by directing 12 standard liters per minute (slm) of ethylene, 5 slm of oxygen, and 2 slm of silane in 535 slm of a nitrogen carrier gas.

A 1156 angstrom coating of antimony/tin oxide alloy was applied onto the silicon oxide coating. Approximately, 17 pounds per hour of dimethyltin dichloride, 270 slm of oxygen, and 150 cc per minute of water were provided in a 200 slm helium carrier gas. About 70 cc per minute of antimony trichloride in solution was added to the precursor stream. The antimony trichloride solution contained about 30 mole percent antimony trichloride in ethyl acetate.

A 692 angstrom coating of silicon oxide was applied over the antimony/tin oxide alloy film. The outer layer was applied by directing a precursor gas mixture containing 42 slm of ethylene, 21 slm of oxygen, and 7 slm of silane in a 535 slm of a nitrogen carrier gas onto the coated glass ribbon.

The resulting coated glass article exhibited a 52.3% visible light transmittance (Ill C) with a neutral color, in accordance with CIELAB Illuminant C 2 degree observer standard, as exhibited by an a* value of 2.1 and b* value of −1.5. The article had a visible light reflection of 1.7 and a neutral color as designated by an a* value of 3.8 and b* value of −4.1. The sheet resistance of the film was greater than 100,000 ohms per square. The antimony content of the antimony/tin oxide alloy was about 11 atomic percent.

EXAMPLE 2

A float glass process was used to produce a clear float glass ribbon having a thickness of 0.125 inches. The glass ribbon was traveling at a line speed of about 433 inches per minute. A conventional coating apparatus is utilized in the float bath to apply a 220 angstrom coating of silicon oxide onto the surface of the float glass ribbon. The coating was applied by directing 12 standard liters per minute (slm) of ethylene, 8 slm of oxygen, and 2 slm of silane in 535 slm of a nitrogen carrier gas.

A 1584 angstrom coating of antimony/tin oxide alloy was applied onto the silicon oxide coating. Approximately, 19 pounds per hour of dimethyltin dichloride, 270 slm of oxygen, and 130 cc per minute of water were provided in a 150 slm helium carrier gas. About 35 cc per minute of antimony trichloride in solution was added to the precursor stream. The antimony trichloride solution contained about 30 mole percent antimony trichloride in ethyl acetate.

A 1561 angstrom coating of a fluorine doped tin oxide was applied onto the antimony/tin oxide alloy. Approximately 6 pounds per hour of dimethyltin dichloride, 230 slm of oxygen, 8 slm of hydrofluoric acid, 9 slm of nitrogen and 150 cc per minute of water were provided in a 150 slm helium carrier gas.

A 692 angstrom coating of silicon oxide was applied over the fluorine doped tin oxide coating. The outer layer was applied by directing a precursor gas mixture containing 45 slm of ethylene, 30 slm of oxygen, and 7.5 slm of silane in a 535 slm of a nitrogen carrier gas onto the coated glass ribbon.

The resulting coated glass article exhibited a 37.2% visible light transmittance (Ill C) with a neutral color in accordance with CIELAB Illuminant C 2 degree observer standard of a* of 4.8 and b* of −6.5. The article had a visible light reflection of 1.4% and a neutral color as designated by an a* value of 0.0 and b* value of −7.3. The sheet resistance of the film was about 40 ohms per square after deleting the top silicon oxide layer with hydrofluoric acid. The antimony content of the antimony/tin oxide alloy was 6.2 atomic percent.

In accordance with the provisions of the patent statutes, the present invention has been described in what is considered to represent its preferred embodiment. However, it should be noted that the invention can be practiced otherwise than as specifically illustrated and described without departing from its spirit or scope. For example, other coating methods, such as sputtering, may also be utilized to form the pyrolytic coating of the present invention.

What is claimed is:

1. An anti-reflective, reduced visible light transmitting coated glass article, comprising:
   (a) a glass substrate,
   (b) a coating of an antimony/tin oxide alloy, having an extinction coefficient of greater than 0.1, applied onto said glass substrate, and
   (c) a coating of a metal oxide applied over said coating of antimony/tin oxide alloy,
      wherein said coated article exhibits a reflectance of less than 2%.

2. A glass article as recited in claim 1, wherein said antimony is present in the antimony/tin oxide alloy at levels of about 5 atomic percent or more.

3. A glass article as recited in claim 1, wherein said antimony is present in the antimony/tin oxide alloy at levels of about 5 atomic percent to about 10 atomic percent.

4. A glass article as recited in claim 1, wherein said article has a visible light transmittance (Ill C) of about 30% or greater.

5. A glass article as recited in claim 1, wherein said coating of metal oxide has a refractive index of about 1.45 to about 1.6.

6. A glass article as recited in claim 5, wherein said metal oxide is $SiO_2$.

7. A glass article as recited in claim 1, wherein said article exhibits a neutral color in transmission and reflectance as defined in the CIELAB system having an a* value from about 6 to about −9 and a b* value of about 6 to about −9.

8. A glass article as recited in claim 1, further comprising a barrier layer applied between said glass substrate and said coating of the antimony/tin oxide alloy.

9. A glass article as recited in claim 1, wherein said glass substrate is a float glass ribbon and said coatings are deposited pyrolytically onto said float glass ribbon.

10. A glass article as recited in claim 1, wherein said antimony/tin oxide alloy is applied at a thickness of about 500 angstroms to about 2500 angstroms, and said metal oxide is applied at a thickness of about 650 angstroms to about 1100 angstroms.

11. A glass article as recited in claim 1, further comprising a conductive metal oxide applied between said antimony/tin oxide alloy and said metal oxide coating.

12. A glass article as recited in claim 11, wherein said conductive metal oxide is selected from the group consisting of indium oxide doped with tin, indium oxide doped with fluorine, tin oxide doped with fluorine, tin oxide doped with antimony, zinc oxide doped with aluminum, zinc oxide doped with fluorine, zinc oxide doped with boron, and tungsten oxide doped with fluorine.

13. A glass article as recited in claim 11, wherein said conductive metal oxide is applied at a thickness of about 200 angstroms to about 5000 angstroms.

14. A glass article as recited in claim 1, wherein said antimony tin oxide alloy has an extinction coefficient of about 0.1 to about 0.3.

15. A glass article as recited in claim 1, wherein said antimony/tin oxide film have a sheet resistance of greater than 500 ohms per square.

16. A glass article as recited in claim 1, wherein said antimony/tin oxide alloy coating is a non-conductive coating.

17. An anti-reflective glass article, comprising:
   (a) a glass substrate,
   (b) a coating of an antimony/tin oxide alloy having a refractive index of about 1.8 to about 2.6 and having an extinction coefficient of greater than 0.1 applied onto said glass substrate, and
   (c) a coating of a metal oxide having a refractive index of about 1.45 to about 1.6 applied onto said coating of antimony/tin oxide alloy, the coated article having a film side reflectance of less than 5%.

18. A glass article as recited in claim 17, wherein said glass article has a visible light transmittance (Ill C) of at least 30% or greater.

19. A glass article as recited in claim 17, wherein said glass article includes a metal oxide coating having a higher refractive index than said antimony/tin oxide alloy applied between said antimony/tin oxide alloy and said coating of metal oxide.

20. A glass article as recited in claim 17, wherein said antimony/tin oxide alloy coating is a non-conductive coating.

* * * * *